June 17, 1969  A. T. ZAVODNY  3,449,944

VIBRATION SENSING METHOD AND APPARATUS USING COHERENT RADIATION

Filed Nov. 18, 1966

INVENTOR.
ALFRED T. ZAVODNY
BY
William J. Miller
ATTORNEY

United States Patent Office 3,449,944
Patented June 17, 1969

3,449,944
VIBRATION SENSING METHOD AND APPARATUS USING COHERENT RADIATION
Alfred T. Zavodny, Ponca City, Okla., assignor to Continental Oil Company, a corporation of Delaware
Filed Nov. 18, 1966, Ser. No. 597,503
Int. Cl. G01n 9/18
U.S. Cl. 73—71.3                                                        16 Claims

ABSTRACT OF THE DISCLOSURE

A vibration measuring apparatus having a lens mounted on the vibrating object. A coherent source of electromagnetic waves, as a laser, is directed through the lens to formed an interference pattern and detector means is positioned to respond to the interference pattern.

---

This invention relates to devices for sensing or detecting vibrations. More particularly, but not by way of limitation, this invention relates to an optical seismic instrument which uses phase interference in beams or rays of coherent electromagnetic radiation for evaluating and analyzing vibrations.

It has previously been proposed to use light as a vibration transducing agent in seismic instruments. In some instances, the transduction using light has been accomplished by measuring the angular displacement of a light beam as it is reflected over an interval of time from a mirror which is rotated or otherwise moved by the vibrating body. In other optical methods, light diffraction patterns generated by light reflected from primary vibration sensing mirrors are employed. Both optical methods, however, have lacked sufficient sensitivity and accuracy to be optimum for use in many instances.

The time and space coherence of monochromatic maser and laser beams make this form of electromagnetic radiation much more suitable for use in any technique involving the observation and measurement of phase interference patterns in convergent beams of the radiation than has previously been the case with observations and measurements of such patterns using incoherent electromagnetic radiation from conventional sources. As a result of this property of coherence, the microwaves or visible spectrum waves developed by stimulated emission in a maser or laser maintain a constant phase relation to each other. Where waves of such coherent radiation are brought into interference, a well defined and constant interference pattern will result, and the pattern will be changed only by changing the distance through which one or both of the interfering waves travels from source to point of interference. The constant, as opposed to random, nature of the phase relationship is coherent radiation interference patterns, once such constant relationships are established, permits the patterns, and the reflecting or refracting devices which produce the patterns, to be accurately and repeatedly identified by suitable detecting or measuring devices. The lack of coherency of electromagnetic waves developed by ordinary sources available prior to the laser and maser devices render such detection and measurement unreliable and, in some instances, even impossible where the incoherent radiation is employed.

The present invention proposes to use coherent electromagnetic radiation, recently made available by stimulated emission devices, for accurately sensing vibrations of small magnitude. Broadly described, in the method of the invention, a plurality of spaced beams or rays of electromagnetic radiation developed by a maser or laser source are directed through a lens having non-parallel faces and capable of causing the rays to intersect each other at a location spaced from the lens. The intersecting rays of coherent radiation form a phase interference pattern which varies markedly and in a predictable fashion as the lens is moved in the slightest degree as a result of vibration being imparted thereto. Thus, by making the lens responsive to vibrations and retaining the radiation source and a detector for the interference patterns in fixed positions in which they are insulated from the vibration by shock mounting, the detected changes in the interference pattern provide an accurate measure of the character and magnitude of the vibration imparted to the lens.

An object of the invention is to provide a highly sensitive method for detecting and measuring vibrations.

Another object of the invention is to provide a simple, relatively inexpensive and easily maintained apparatus which can be used to detect vibrations having a very high frequency.

An additional object of the invention is to provide a high precision displacement sensor which can be used for detecting and measuring a minute physical displacement occurring at a remote location as a result of shock waves or vibration.

In addition to the specifically mentioned objects, and the advantages hereinbefore described, additional objects and advantages of the invention will become apparent as the following detailed description of exemplary embodiments of the invention is read in conjunction with the accompanying drawings which illustrate the invention.

Figure 1:
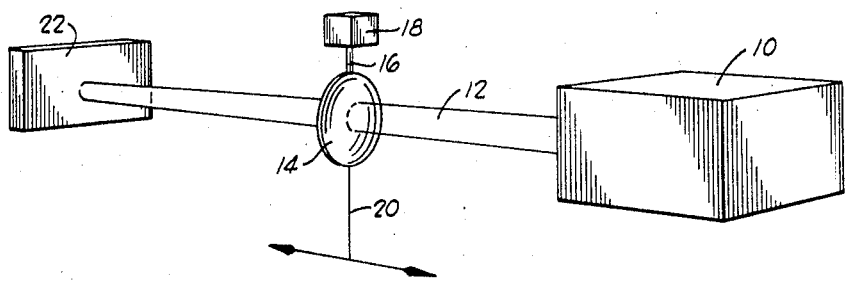
FIGURE 1 is a schematic illustration of one embodiment of apparatus which can be utilized in practicing the present invention, illustrating such apparatus in a relatively basic and simple arrangement which it may assume during the practice of the invention.

Referring now to the drawings, and initially to FIGURE 1, a source of coherent electromagnetic radiation, such as a laser or maser, is illustrated schematically and is designated by reference numeral 10. A beam 12 of the coherent electromagnetic radiation produced at the source 10 is transmitted through a lens 14 which is pivotally suspended by a suitable flexible connecting element 16 to a supporting element 18. A vibration or displacement sensor 20 is connected to the lower edge of the lens 14 and is schematically depicted in FIGURE 1. The vibration sensor 20 may be considered as rigidly connected to the lens 14 in such a way that movement of the vibration sensor in either of the directions indicated by the arrows will cause a displacement of the lens 14 by an equivalent or proportional amount, with such displacement being in a direction which is parallel to the direction of propagation of the coherent electromagnetic waves 12 in the example under discussion. On the opposite side of the lens 14 from the source of coherent electromagnetic radiation 10, a detector 22 is located which is capable of responding to the intensity of the light impinging thereon at various closely spaced points over an area occupied by an interference pattern as hereinafter described.

Having broadly described the several basic elements included in a fundamental arrangement of apparatus required for the practice of the present invention, the several elements of apparatus will next be discussed in greater detail conjunctively with an explanation of the manner in which the method of the invention is practiced. A laser producing monochromatic radiation of visible wave length constitutes the preferred source of coherent electromagnetic radiation for use in the present invention, and it will therefore be assumed in describing the operation of the apparatus depicted in FIGURE 1 that the source 10 constitutes a laser apparatus. The laser apparatus can be any of the various types which are now in use for providing a continuous output of relatively high intensity, low power radiation in the visible wave length portion of the electromagnetic spectrum. A helium-neon laser has been found to be particularly suitable, but other types may also be used. It should also be pointed out that maser devices producing radiation in the microwave region of the electromagnetic spectrum can also be utilized by modification of the lens and detecting device employed in the system.

The light waves which emanate from the laser source 10 are essentially monochromatic and are time and space coherent. The beam 12 of coherent light waves from the laser source 10 can be made to travel over great distances with very little divergence or spreading of the beam. In FIGURE 1, the light beam 12 is shown directed against the center of one face of a convex-convex glass lens which is mounted in such a way that it will respond to very minute vibrations transmitted to it from the vibration sensor 20 to which it is connected.

Figure 2:
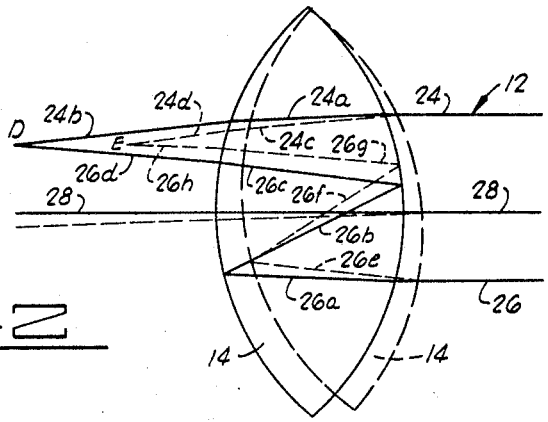
FIGURE 2 is a schematic illustration of one type of lens which can be utilized in the practice of the present invention, and illustrating the manner in which rays of coherent electromagnetic radiation impinging on the lens are reflected and refracted by the lens to produce a phase interference pattern on the opposite side of the lens from that upon which the radiation originates.

Referring next to FIGURE 2 of the drawings, the manner in which coherent light from the laser source 10 is reflected and refracted by the lens 14 is schematically illustrated. Two positions of the lens 14 are illustrated in FIGURE 2, the solid line illustration representing the lens in that location which it occupies prior to displacement as a result of a vibration being imparted thereto. The dashed line position of the lens 14 is its position after it has been displaced from its initial or at-rest position by a vibration imparted thereto. In the same vein, the solid line representations of the coherent light rays which enter and pass through the lens represent these rays as they are affected by the lens in its at-rest position. The dashed line portrayal of the rays represents the manner in which the rays are reflected and refracted after the lens 14 has been displaced to its dashed line position by a vibration.

Let it be assumed that the beam 12 from the laser source 10 is of a breadth such that the waves 24 and 26 are located adjacent its peripheral edge, and that the beam 12 also includes a wave 28 which is propagated in a line which is coaxial with the lens in its at-rest or solid line position. The ray 28, of course, travels in a straight line through the lens and is not refracted. It will be noted, however, that upon striking the lens when it is at-rest or before its displacement by vibration, the ray 24 is refracted as it enters the lens, and follows the path 24a to the opposite side of lens 14 where it is again refracted and emerges as the ray 24b. As contrasted with this effect upon ray 24, the ray 26 located at or near the other limit or boundary of the monochromatic light beam 12 is refracted slightly upon entering the lens 14 so that it passes from one face of the lens to the other along the path 26a. From the rear or back face of the lens 14, the ray 26 is partially reflected back toward the front or forward face of the lens along the path 26b. At the forward or front face of the lens 14, the ray 26 is again partially reflected, with such partially reflected portion being transmitted through the lens along the line 26c. Finally, the thus reflected portion of the ray 26 is refracted at the rear face of the lens 14 and emerges along the path 26d.

At some point D to the left of the lens 14 as depicted in FIGURE 2, the rays traveling along paths 24b and 26d will intersect or cross, and phase interference between these two rays will occur at this point. If the difference in the effective path lengths of the rays 24 and 26, including their described refracted and reflected portions, as measured from the source to the point of phase interference D, is equal to a whole number of wave lengths, then constructive interference occurs at point D. In such constructive interference, the waves emerging from the lens 14 along paths 24b and 24d reinforce each other, and a bright spot of relatively high intensity appears at point D as seen by a detector capable of sensing the intensity of the light at point D. If, as contrasted with the occurrence of constructive interference at point D, the waves 24 and 26 travel through paths which differ in their effective length by an odd multiple of half wave lengths, cancellative or destructive interference will occur. In such event, a dark spot will result at point D and will accordingly be indicated by a suitable detecting device located at that point.

The phase interference phenomena which occurs as described in the case of the waves 24 and 26 also occurs with respect to other light waves located in the beam 12 between the defining peripheral beams 24 and 26. These peripheral beams 24 and 26, however, establish at their point of intersection D, the most remote location with respect to the lens 14 at which a detecting device should be located in order to detect the interference phenomena which occurs with the lens 14 disposed in its pre-displaced position. In other words, in the case of all pairs of waves located within the beam 12 and between the peripheral waves 24 and 26, the phase interference phenomena will occur at points no more distant from the lens than the point D, and thus the detector 22 should be located at point D, or at some point closer to the lens 14.

Let it now be assumed that a shock wave or vibration of some type has been imparted to the lens 14 by the vibration sensor 20 so as to cause the lens to be displaced from its full line position to the position illustrated in dashed lines. A displacement of the lens 14 in this fashion changes the character of the interference pattern produced as a result of refraction and reflection of the monochromatic light beam incident on the lens. Thus, the incoming ray 24 is, by reason of the displacement of the lens 14, now refracted upon passing through the forward or front face of the lens to a path 24c. On passing from the back or rear face of the lens 14, the ray 24 is further refracted and follows the path 24d. The ray 26, on the other hand, is now initially refracted by passage through the forward face of the displaced lens 14 and passes through the body of the lens along the path 26e. A part of the refracted ray 26e is reflected from the rear face of the lens 14 and passes along a path 26f until the ray is again partially reflected from the front face of the lens and passes toward the back face along the path 26g. Finally, the ray 26 is refracted at the rear face of the lens 14 and emerges along a path 26h. The ray 26h then intersects or crosses the ray 24d at point E and the interference pattern is obviously changed or modified. The portions of the incident rays 24 and 26 traveling along the paths 24d and 26h, respectively, have now been caused to travel through different effective path lengths and the resulting interference pattern will therefore be different. In other words, where a constructive interference, for example, initially resulted at point D, destructive or partially destructive phase interference may now result at point E and the type of interference pattern sensed by the detector will differ from the original interference pattern in correspondence to the extent to which the lens 14 has been moved by vibration.

The detector 22 which is employed for detecting and registering the interference pattern resulting from the refraction and reflection of the monochromatic waves in the beam 12 by the lens 14 can be any of several types whose characteristics and capabilities are well known in the art. Thus, a plurality of photodetector devices which respond to light intensity can be positioned at a location on the proper side of the lens for responding to the interefence pattern. The several photodetector devices will, of course, be positioned at various points within the interference pattern to receive the reinforcing and cancelling portions of the pattern. The photodetector devices can be constructed to provide suitable output signals which can be amplified and recorded or otherwise measured to provide an indication of a particular interference pattern which is developed by the lens 14 in any position which it may assume. A suitable photodetector array for use in the detection and analysis of such interference patterns is described in co-pending application Ser. No. 511,717 filed Dec. 6, 1965, and assigned to the assignee of this application.

It should be pointed out that, due to the coherency and monochromatic character of the laser beam 12, the interference pattern which is developed on the opposite side of the lens 14 from the laser source 10 will remain constant at a given detector location provided the source 10 and the lens 14 remain constant or fixed in their positions. It should also be pointed out that, though a convex-convex lens has been depicted in the illustrative embodiment hereinbefore described, a lens of substantially any shape other than one having precisely parallel planar faces can be utilized equally effectively. Thus, a concavo-convex lens could be employed or a concave-planar lens, or a lens having a pair of nonparallel, substantially planar faces (wedge-shaped). Since the latter type of lens constitutes a preferred lens for use in the invention, more will be said about its use for the establishment of the interference pattern hereinafter.

Finally, it may be noted that while the foregoing description of the invention has made reference to the use of a collimated laser beam of monochromatic light in describing the incident beam 12, the principles of the invention as hereinbefore described are equally applicable to divergent radiation or convergent radiation, provided only that coherent radiation is employed. Also, devices equivalent in their function to the lens 14 can be provided for the reflection and refraction of coherent radiation of microwave wave lengths and, in such event, of course, a suitable maser device would be employed as the source of the coherent radiation.

Figure 3:
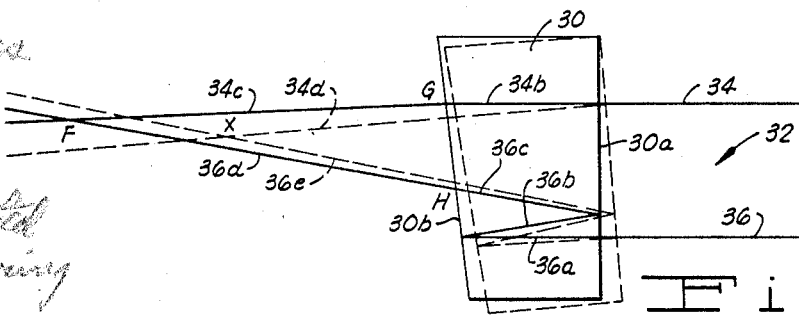
FIGURE 3 is a view similar to FIGURE 2, but illustrating a differently shaped lens which can be used in practicing the invention.

A relatively inexpensive type of lens which can be used to advantage in the practice of the present invention is the slightly wedge-shaped lens 30 depicted in FIGURE 3. The lens 30 has a pair of non-parallel planar faces 30a and 30b. The initial or at-rest position of the wedge-shaped lens 30 is illustrated with a solid line, and the displaced position of the lens is illustrated by a dashed line. Considering again a collimated beam 32 of monochromatic light as impinging on the front face 30a of the lens 30, the refraction and reflection of the outermost rays 34 and 36 of the beam 32 by the lens 30 are schematically depicted in FIGURE 3. Observing first the beam 34, this beam is slightly refracted upon passage through the front face 30a of the lens 30 and traverses the lens along the path 34b. A second refraction occurs at the rear face 30b of the lens 30 so that the emergent ray follows the path 34c. With respect to the incident ray 36, this ray is refracted slightly by passage through the front face 30a of the lens 30 and traverses the lens along the path 36a. A portion of the ray 36 is then reflected toward the front face 30a along the path 36b, and is partially reflected from the front face along the path 36c.

After a slight refraction of the ray 36c at the rear face 30b, the emergent refracted ray follows the path 36d until it crosses or intersects the ray 34c at point F. Here phase interference of the type hereinbefore described results with the result that an interference pattern is established at point F and at all points within the triangle FGH. Thus, a detector placed at point F, or at any position within the triangle FGH will sense an interference pattern resulting from phase interference occurring between the rays of the beam 32 or any portion of these rays between the peripheral rays 34 and 36. Actually, as previously pointed out, the point of convergence of the rays 34 and 36 to form an interference pattern will be shifted slightly upon shifting of the lens 30, and may be displaced, as in the illustrated dashed line portrayal in FIGURE 3, to the point X which is located closer to the lens 30 than the point F. Thus, the detector should be positioned at some point between the point X and the lens 30 and within the triangle formed by the rear face of the lens and the two convergent rays 34d and 36e in order to assure that the detector will respond to the changing interference pattern, despite changes in the position of the lens 30. As previously pointed out, very minute displacements of the lens 30 will result in a change in the effective path lengths of the rays 34 and 36 from their sources to the point at which they cross and produce an interference pattern. Thus, the location of bright and dark areas in the interference pattern as a result of reinforcing and cancelling interference, respectively, will be varied with very slight variations in the position of the lens 30.

From what has been said about the schematically depicted system in the foregoing discussion, it will be apparent that by utilizing a lens in conjunction with a suitable vibration or displacement sensor which imparts an actual physical displacement to the lens as a result of vibrations occurring in the vicinity of the sensor, the system can be made to function as an accurate vibration sensing and recording apparatus which can be used, for example, in seismic technology, as well as in many other vibration measuring techniques. In the preferred method of using the described apparatus for the purpose of measuring vibrations, the lens is mounted directly to the ground or to the object being vibrated so that the lens is characterized in having three degrees of freedom of movement. The amount of displacement of the lens in each degree of freedom of movement can then be deduced from the resulting interference pattern as the pattern is detected by a suitable detector, followed by translation of the detector signal to a suitable read-out or recording device. The ability to simultaneously detect the movement or vibration of the earth or any other object in three degrees of freedom of movement is believed to be unique among vibration transducers.

In other embodiments, an arrangement such as that depicted in FIGURE 1 may be preferred. In this arrangement, the lens 14 can be freely displaced about a pivot 16 while the rest of the system, including the source 10 and detector 22 are shock mounted so as to be free of displacement in response to vibration. Due to the high coherence of the type of radiation employed in the invention, the system can be well adapted to use as a remote displacement sensor with the source of the coherent radiation being located at a substantial distance from the vibrating lens and the detector which is associated therewith. The detector itself can be located at a considerable distance from the lens if the faces of the lens are properly configured to develop the interference pattern at a substantial distance from one side of the lens.

Figure 4:
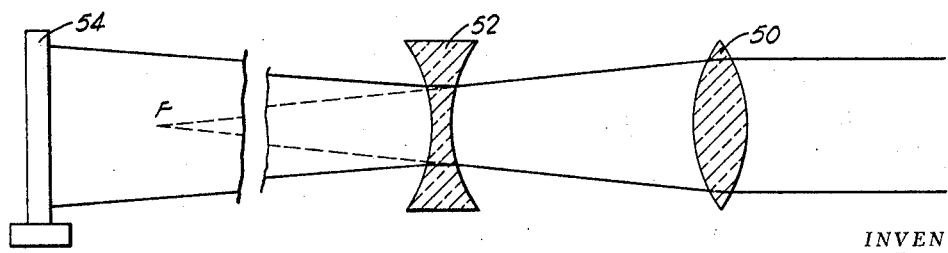
FIGURE 4 is a schematic illustration of yet another arrangement of apparatus which can be used in practicing the invention.

In FIGURE 4, an arrangement of lenses is shown which can be used for the purpose of projecting the interference pattern to a more distant point at which it may be more convenient to locate a suitable detecting device. The type of lens used for creating the interference pattern by being positioned for the initial impingement of coherent light thereon is not critical, as has been previously explained. In other words, the lens which is first in line can be any lens which by refraction and/or reflection can cause coherent radiation waves to converge and cross or intersect to form an interference pattern. In FIGURE 4, a convex lens 50 is illustrated in use as the first lens contacted by the light to form an interference pattern at any location within the cone-shaped zone defined by its focal point F and the rear surface of the lens. Within this zone, a divergent lens 52 having one or more concave surfaces is positioned. The effect of this utilization of the divergent lens 52 is to project the interference pattern (which exists in the plane in which the divergent lens is located) an infinite distance in a frusto-conical zone of expanding cross-sectional area. Thus, the use of the divergent lens 52 provides two advantages. First, a suitable detector device 54 can be located at a relatively great distance from the lenses and source of coherent electromagnetic radiation. Second, the enlargement of the interference pattern permits greater flexibility in the selection of detector devices which can successfully be employed for detecting and characterizing the interference pattern.

What is claimed is:
1. A method of sensing vibrations comprising:
   generating a beam of coherent electromagnetic radiation;
   positioning in the path of said beam of coherent electromagnetic radiation, a lens capable of deflecting rays of electromagnetic radiation in said beam into convergence to establish a phase interference pattern at a location spaced from said lens, said lens also being positioned to respond by movement to the vibrations to be sensed; and
   positioning at the location of an interference pattern developed by said lens, a detecting device capable of detecting and indicating the character of said phase interference pattern.

2. The method defined in claim 1 wherein said detector and the source of said beam of coherent electromagnetic radiation are shock mounted to prevent their response to said vibrations.

3. The method defined in claim 1 wherein said beam of coherent electromagnetic radiation is generated by providing a laser device in spaced relation to said lens, and directing the beam of coherent light emanating from said laser device against said lens.

4. The method defined in claim 1 wherein the lens employed is capable of refracting rays of coherent electromagnetic radiation emerging from one face thereof, and of internally reflecting rays of coherent electromagnetic radiation between a pair of opposed faces thereof.

5. The method defined in claim 4 wherein said lens has a pair of non-parallel, planar faces against one of which said beam of coherent electromagnetic radiation is directed.

6. The method defined in claim 1 wherein said detecting device is positioned between said lens and the farthest point spaced from said lens at which any two rays of coherent electromagnetic radiation in said beam cross after being deflected by said lens.

7. The method defined in claim 1 wherein said lens is mounted in direct communication with the earth for response to vibrations thereof with three degrees of freedom of movement.

8. The method defined in claim 1 and further characterized to include the step of positioning a diverging lens between said first mentioned lens and the detecting device to project an interference pattern over a greater distance to said detecting device.

9. Apparatus for detecting vibrations comprising:
   a source of coherent electromagnetic radiation;
   means for deflecting rays of coherent electromagnetic radiation into convergence interposed in a beam of coherent electromagnetic radiation originating at said source;
   detector means spaced from said deflecting means and positioned at least in part at a point where a phase interference pattern results from convergence of said deflected rays; and
   means mounting said deflecting means for movement responsive to the vibrations to be detected.

10. Apparatus as defined in claim 9 wherein said deflecting means comprises a lens capable of refracting and internally reflecting rays of electromagnetic radiation.

11. Apparatus as defined in claim 10 wherein said lens is wedge-shaped, having two non-parallel, planar faces, one of which is exposed to a beam of electromagnetic radiation from said source.

12. Apparatus as defined in claim 9 wherein said detector means comprises a plurality of photodetector cells.

13. Apparatus as defined in claim 9 wherein said mounting means includes a vibration sensor secured to said deflecting means and responsive to said vibrations.

14. Apparatus as defined in claim 9 wherein said detector means includes:
   a diverging lens positioned at the location of a phase interference pattern resulting from the convergence of rays of electromagnetic radiation after passing through said deflecting means; and
   a detector device for detecting an interference pattern projected by said diverging lens and positioned on the opposite side of said divergent lens from said ray deflecting means.

15. Apparatus as defined in claim 10 wherein said source of electromagnetic radiation is a laser and said detector means comprises a plurality of photodetector cells.

16. Seismic apparatus for detecting vibrations of the earth comprising:
   a lens mounted on the earth for movably responding to vibrations of the earth;
   a lasser apparatus for developing a continuous beam of coherent electromagnetic radiation and positioned to direct said beam against and through said lens; and
   an interference pattern responsive device positioned on the opposite side of said lens from said laser at a location at which said lens develops a phase interference pattern by deflection of waves of electromagnetic radiation in the beam developed by said laser apparatus.

References Cited

UNITED STATES PATENTS

| 1,625,625 | 4/1927 | Ricker | 73—71.3 |
| 3,073,168 | 1/1963 | Adams et al. | 73—517 |

OTHER REFERENCES

Bowie, Glenn E., Interferometric Measurement of Vibration Amplitudes, Applied Optics, October 1963, pp. 1061–1067.

RICHARD C. QUEISSER, Primary Examiner.

JOHN P. BEAUCHAMP, Assistant Examiner.

U.S. Cl. X.R.

88—14